Figure 1:
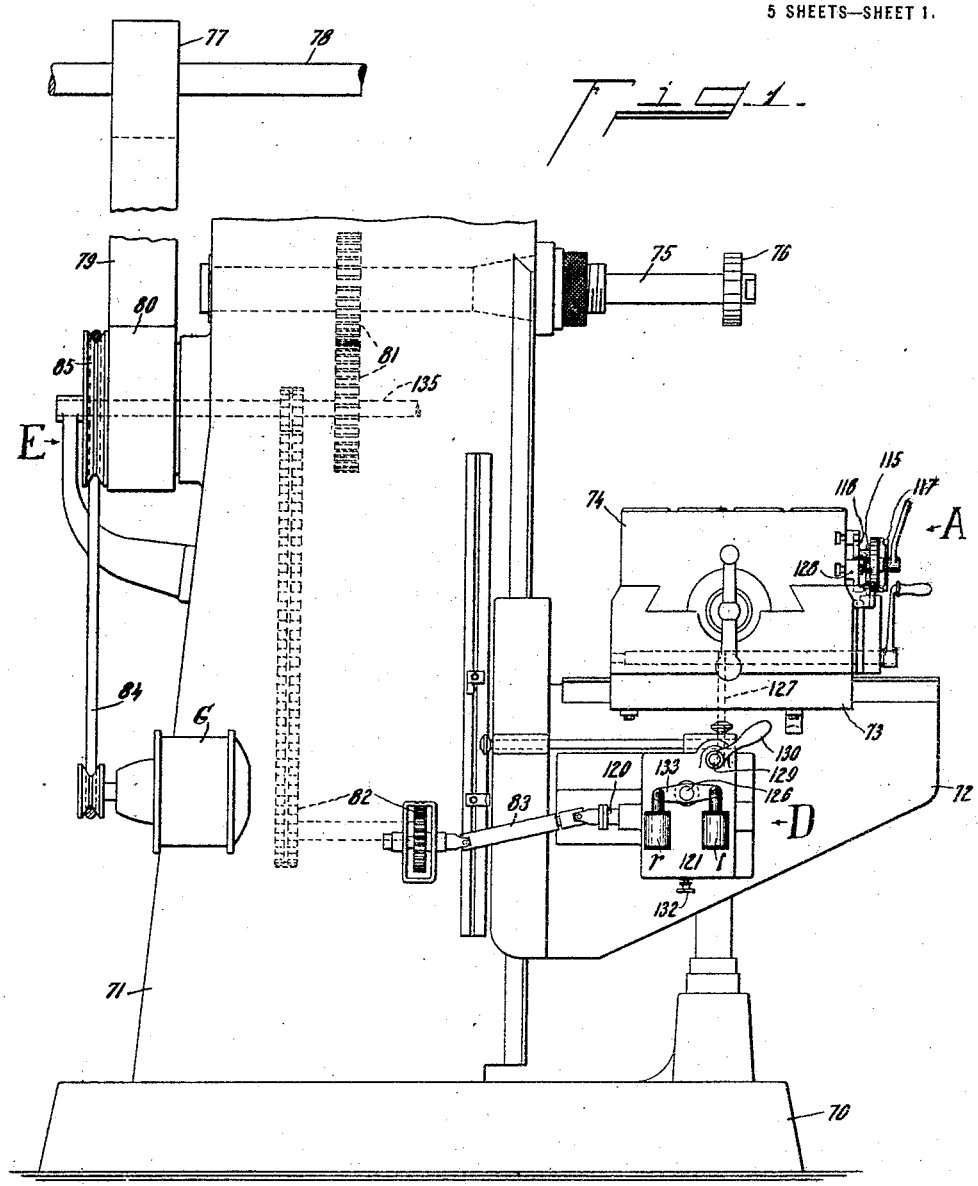

A. L. DE LEEUW.
MACHINE TOOL CONTROL.
APPLICATION FILED FEB. 19, 1913.
1,144,935.
Patented June 29, 1915.
5 SHEETS—SHEET 3.
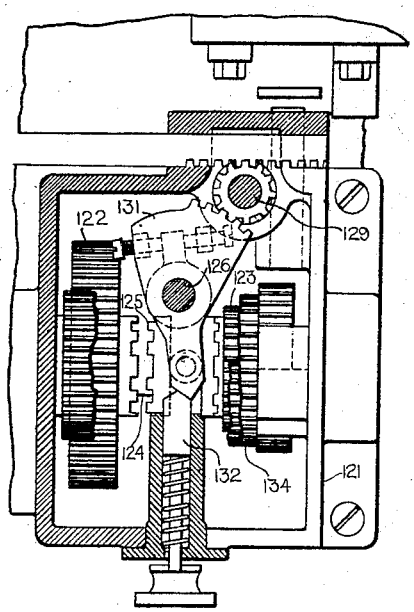
Fig. 3
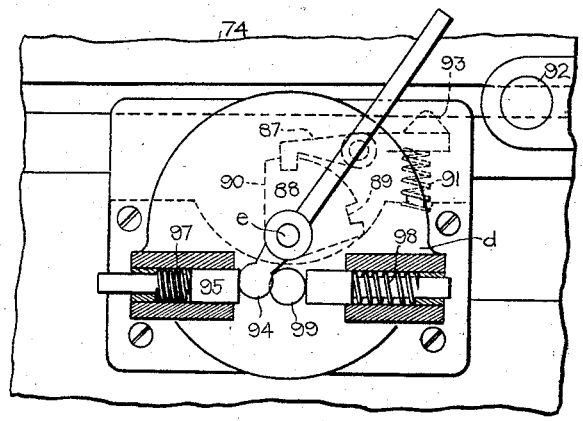
Fig. 4
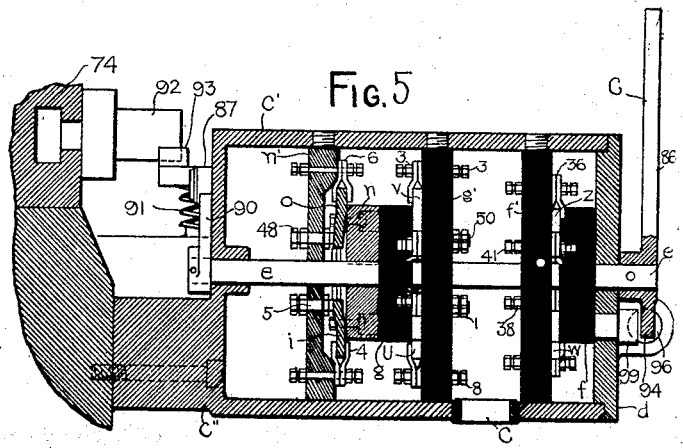
Fig. 5
Fig. 6
WITNESSES:
H. J. Brunjes
B. Cooke
Adolph L. De Leeuw
INVENTOR.
BY Albert F. Nathan
ATTORNEY.

A. L. DE LEEUW.
MACHINE TOOL CONTROL.
APPLICATION FILED FEB. 19, 1913.

1,144,935.

Patented June 29, 1915.
5 SHEETS—SHEET 4.

WITNESSES:
H. G. Brunjes
F. Cooke

Adolph L. De Leeuw
INVENTOR.
BY Albert F. Nathan
ATTORNEY.

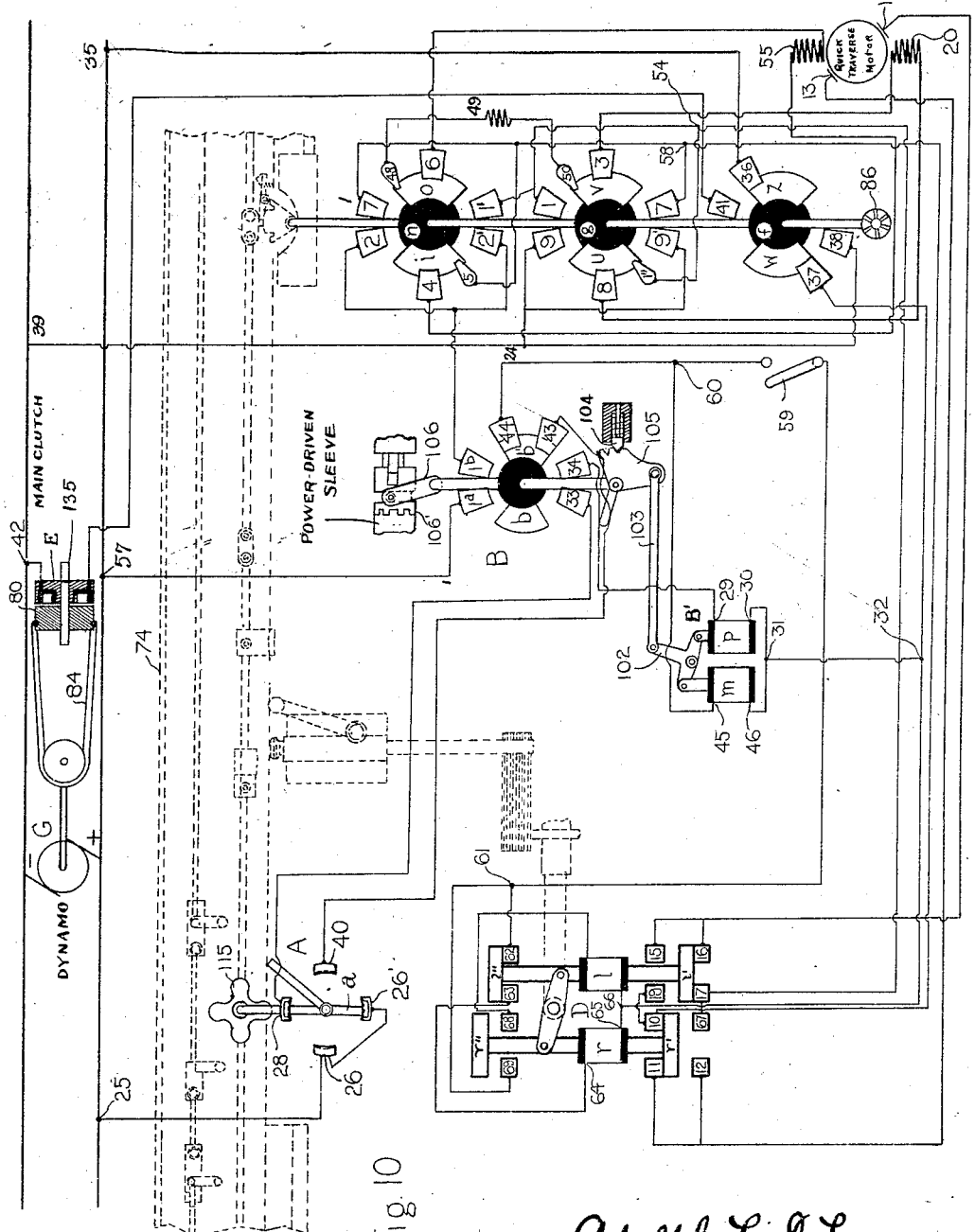

UNITED STATES PATENT OFFICE.

ADOLPH L. DE LEEUW, OF CINCINNATI, OHIO, ASSIGNOR TO THE CINCINNATI MILLING MACHINE COMPANY, OF CINCINNATI, OHIO, A CORPORATION OF OHIO.

MACHINE-TOOL CONTROL.

1,144,935.  Specification of Letters Patent.  Patented June 29, 1915.

Application filed February 19, 1913. Serial No. 749,292.

*To all whom it may concern:*

Be it known that I, ADOLPH L. DE LEEUW, a citizen of the United States, residing at Cincinnati, in the county of Hamilton and State of Ohio, have invented certain new and useful Improvements in Machine-Tool Control, of which the following is a specification.

This invention deals with an improved control system for an operating mechanical organization, and in its preferred more concrete aspect, it proposes an electro-mechanical system for enhancing the automatic capacities of machine tools, such as milling machines, screw machines, etc.

One object within the contemplation of this invention is to render available a control-system that is readily applicable to various machines to effect a more complete regulation of the automatic operations thereof, as well as more efficiently to enable the various distinctive speeds of the cycle of movements of a given machine element to be moderated or amplified in duration, and to provide for a wide range of alteration in the timing or sequence of speed changes and reversals in the cycle.

Another object is to establish a control-system affording the attendant a wide range of adjustability; enabling him in the simplest possible manner, and without drawing upon a high order of skill or of understanding, to set the mechanism for automatically performing such more or less complex actions as may be best adapted for accomplishing a given amount of useful work in the shortest aggregate time.

Another object is to create an automatic control-system of a very simple physical character; composed of as few parts or elements as may be consistent with the capacity and requirements of the system, and which may be used in connection with conventional hand-operated elements without interference or occasioning undue difficulty or trouble to the attendant, so that should the automatic capacity of the mechanism become impaired or not be required, the attendant will nevertheless be enabled to control the machine by operating hand-levers with all the facility and convenience of conventional machines.

Another object is to formulate a control-system in which purely mechanical features and actions are coördinated with purely electrical instrumentalities and effects to the end that the automatic capacities of the mechanism may be promoted and rendered more efficient and adaptable to meet the various working conditions that may from time to time arise.

Another object is to provide a mechanical organization in which a work or tool supporting-element may be caused automatically to progress through a predetermined cycle of operations, at times under the actuation of a high-power or major driving means, and at other times being propelled by a low-power or auxiliary driving means: and to do so in such a way as will enable the sequence and duration of such operations to be easily adjusted and determined by the attendant without necessitating complex and costly instrumentalities.

A further purpose is to devise an instrumentality, largely electrical in nature, capable of being adapted to existing machines to enhance the automatic capacities thereof, without necessarily involving extensive alterations or reconstructions as to such machines, and to relate the electrical control features to the purely mechanical control features in such a way that should the former cease to function, the latter will still operate.

An object more especially inhering to the preferred embodiment of this invention is to provide a system of control solenoids for machine tool elements whereby current solenoids, as distinguished from voltage solenoids, may be made available in such a way that they will be excited for brief periods only, as solely when effecting the shift, thereby avoiding heating of the coils, waste of current, excessive sparking, and uncertain or tardy actions.

Another object is to devise a clutch-shift-mechanism embodying solenoids as actuating means and mechanical elements as means for operatively applying the magnetic power to effect the shifting of clutches, and to arrange and relate the parts in such a manner that the initial part of the movement will be induced by the magnetic power against the resistance of a spring and the continued part of the movement will be insured by the reflex action of said spring, whereby the clutch will be thrown definitely into either of its two extreme positions to stop or start or reverse or vary the speed, as the case may be of a traveling support all by automatic trip mechanism actuated in the first instance by the support itself.

Another object is to devise an arrangement whereby the table as well as the cutter will come to a stop after all of the pieces bolted thereon have been subjected to the action of the cutter, so that new work may be bolted to the table without liability of injury to the attendant by contact with a rotating cutter.

A more specific object in this connection is to provide mechanism whereby the table may be caused rapidly to return to its initial position by merely throwing an appropriate lever, without thereby enabling the attendant to speed up the cutter until the table has completed its return stroke and is ready again to advance.

Another object is to formulate an arrangement whereby the table may advance by alternate fast and slow travels; may have a rapid continuous return stroke; and by merely throwing a switch lever, its return stroke may be changed in character to correspond exactly with and duplicate the cycle of its advance stroke.

Another object is to make a machine tool more wieldy in operation and manipulation and better responsive to the requirements of the highest order of shop efficiency; and to do so by utilizing the main or primary power for more deliberately propelling the parts against the greater resistance arising during the tooling periods, and utilizing a secondary source of power, such as a low-power electric motor, for effecting the more rapid but comparatively free movements of the purely positioning operations, and incidentally providing for throwing the motor into short-circuit to form a dynamic brake operative during certain stages in the cycle of operations quickly to bring the moving parts to a more or less cushioned standstill and avoid undue shock or strain.

Another object is to enhance the efficiency of machine-tools while yet promoting the safety of the same.

Another object is to design an electrical control-system for a machine tool that will be extremely simple in point of installation involving but few and simple parts; which will be extremely handy from a manipulative standpoint; which by the mere throwing of a switch can effect a radical change in the operation of the machine; which will afford every facility in adjustment and permit of effecting a wide range of variation in the automatic operations of the machine; and which may be easily modified for various types of machines and conditions of usage.

Other objects and advantages will be in part indicated in the following description, and in part rendered apparent in connection with the annexed drawings.

To enable others skilled in the art so fully to apprehend the underlying features hereof that they may embody the same by the numerous modifications contemplated by this invention, drawings depicting a preferred typical construction have been annexed as a part of this disclosure, and in such drawings, like characters of reference denote corresponding parts throughout all of the views, of which:—

Figure 2:
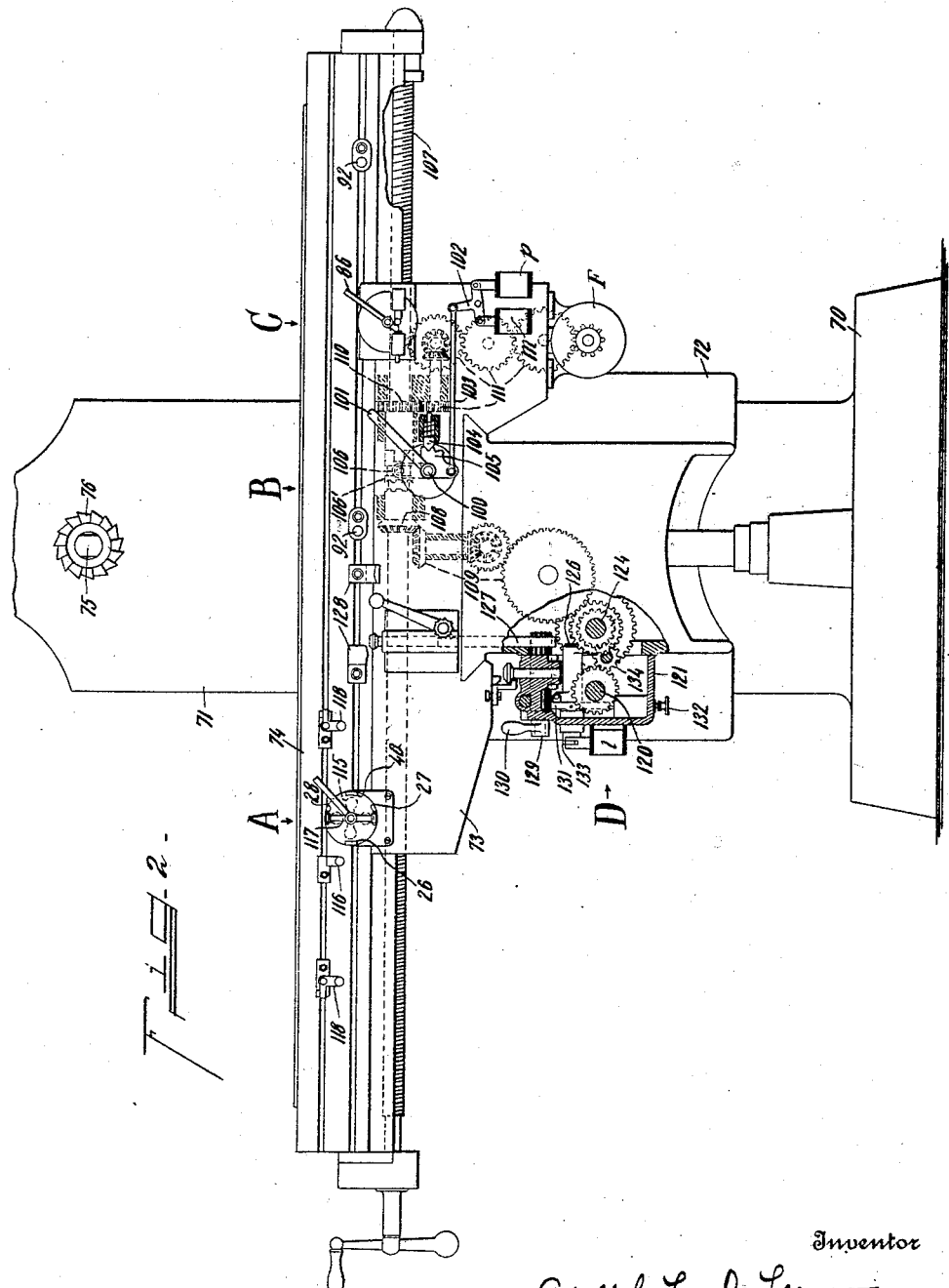
Figure 9:
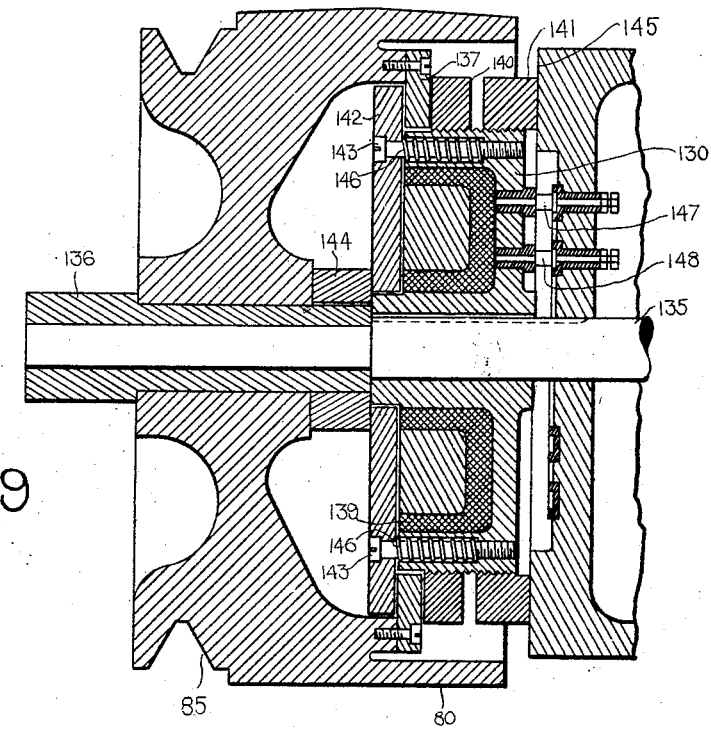
Figure 8:
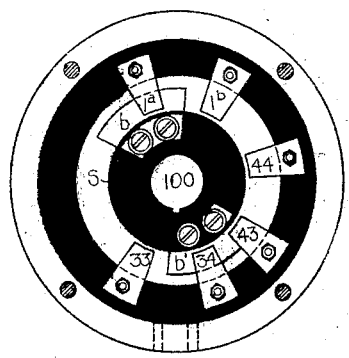
Figure 7:
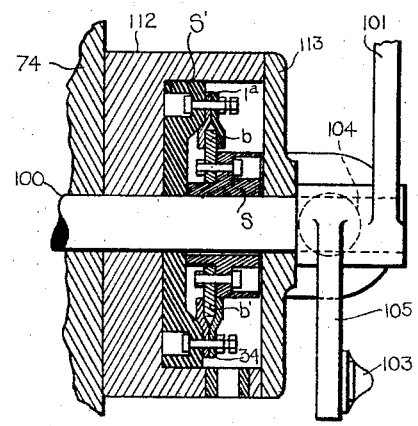

Figure 1 represents a side elevation of a conventional milling machine embodying this invention. Fig. 2 is a front elevation of the said machine. Fig. 3 is a detail section through the mechanical features of the solenoid operated reverser D. Fig. 4 is a front elevation of the main switch C. Fig. 5 is an axial section thereof. Fig. 6 shows the detailed relationship of the three switch disks on the switch shaft. Fig. 7 is a section through the motor and solenoid switch used with the clutch-switch B. Fig. 8 is an interior elevation thereof. Fig. 9 is a section through the main drive magnetic clutch. Fig. 10 is a diagrammatic wiring indicating the electrical relationship existing between the various elements of this invention.

Continuing now by way of a more detailed description of the shown exemplification of this invention, it may be preliminarily noted that in machine-tool operations considerable time is usually lost in effecting the actual contact between the tool and the work. The two will in the first instance be distanced apart, and to save time it is necessary that either the tool or the work, as the case may be, shall be moved to the other as rapidly as is practical, but thereafter it is necessary that the rate of travel shall be reduced to a point corresponding to the requirements of the ensuing tooling operation. In the case of a milling machine, for example, the work is bolted to a table that travels with relation to a fixed rotary cutter and, either by reason of a succession of separate pieces of work or by reason of the broken or interrupted surface of a given piece of work, the time of actual use could be reduced in the aggregate if the table could be caused to travel faster and slower at intervals, corresponding with the duration and frequency of the mere traveling and the actual tooling operations. This class of work calls for an intermittent forward propulsion of the table and a quick continuous return, i. e., a forward series of alternating fast-idle travels and slow-working feeds, which series (in the case of a reciprocating table) may be succeeded by a quick return providing a time interval sufficing for the replacement of the work on the table.

In another instance, the milling operation may be practically rhythmic, and the table may reciprocate from one extreme to the other in such a way as to duplicate its cycle of movements during both the forward and the backward swing. As the tooling operation is necessarily of a relatively long duration, the attendant may be enabled to clamp an unfinished second piece of work on to the advancing end of the table, while the first piece is being tooled; but to avoid loss of time, it is necessary, when the table reverses its direction of travel, to cause it to travel rapidly during the first half of its stroke (while the tool is returning over the finished piece i. e. through the distance it has just traveled while cutting it) and then the speed of the table must be reduced to the degree required for the tooling operations, since the tool is now about to start cutting the last added piece of work, and so on in succession. It will thus be seen that the travel of the carriage may be resolved into what are really "positioning" movements and also into what are really "feeding" movements. Technically, the tooling movement is known as a "feed" and the positioning or non-tooling movement is termed a "traverse", or a "quick traverse", or a "quick advance", or a "quick-return", according to its direction.

Now this invention proposes an arrangement such that the table, support or carriage for the tool or the work, as the case may be, may be caused to advance or retreat at either a "feed" or a "traverse" rate and to do so in any sequence or duration of operations desired.

Turning now to Figs. 1 and 2, 70 represents the base and 71 the column of a machine tool (in this embodiment a milling machine) and 72 indicates the knee thereof, which is adjustable vertically to bring the work nearer the cutter. On this knee is a saddle 73 slidably adjustable in the direction of the axis of the rotating cutter to position the work laterally; and superposing this saddle is the main table or work support 74 that is arranged slidably to reciprocate on the saddle 73 in a direction transverse to the axis of the spindle supporting the rotary cutter. This spindle is here indicated by 75, and it carries a suitable cutter 76. In this instance, the machine receives the major or primary driving power from a pulley 77 on a suitable counter-shaft 78 through a belt 79 that travels around the periphery of a pulley 80 that is journaled (see Fig. 9) on a stationary non-rotatable member 136 fixed at one side of the column of the machine. By means of an intervening magnetic clutch E, the pulley 80 is given a driving connection, through suitable transmitting elements including a shaft 105 and gearing 81, with the spindle 75 whereby the latter is positively rotated at the speed properly corresponding with the diameter and character of the milling cutter 76 and the class of cutting performed thereby. Through a second line of transmitting elements, such for example as the gearing 82 and the flexible shaft 83, the power pulley 80 is enabled to be brought (through clutch mechanism D and B subsequently to be described) into propelling relation with the table or support 74, whereby the latter may be caused to travel at any predetermined slow rate of travel or so-called feed (the speed of which may be varied as usual in accordance with the character of the work to be performed by the milling cutter) through a mechanical application of the major or primary power. The parts thus described are actuated by the major or primary power and perform the slower but more laborious operations arising when the machine is actually tooling the work, but there are certain other movements that are of a purely positioning nature, and the aggregate efficiency of the machine therefore is dependent upon the speed at which these more or less idle or waste movements are carried out. Preferably this invention proposes auxiliary or secondary power for the purpose of obtaining these more rapid but non-working movements and, to that end an auxiliary pulley 85 will be arranged in unitary relation with the main pulley 80, as by providing the latter with a suitable groove for receiving a small belt 84 which rides over a small-diameter pulley $x$ which is journaled to the column in a suitable manner below the main-pulley so as to be driven at a relatively high speed thereby. The quick-traverse of the table is effected by power derived from this lower auxiliary pulley $x$ through suitable means. Thus, an electric motor F (see Fig. 2) may be mounted on the machine so as to have a mechanical driving connection with the table or support 74, as will soon be described, and while the electrical energy for this motor may be derived from any convenient source of electricity, it preferably comes from a small dynamo G mounted on the column 71 of the machine, and driven continually by the auxiliary pulley $x$ which is driven in the first instance by a suitable belt 84 passing in the groove 85 of the main drive pulley 80, as has been described.

The following detailed analysis of this system may be more easily followed by first observing that, among other actions, it is effective to cause the spindle and the work-support to be simultaneously moved in proper feeding-relation for milling the work (deriving the power from a main drive); then at another time to disconnect the work-support from the main or high-power drive and propel it rapidly by power derived from an auxiliary or low-power motor while in the meantime permitting the cutter to be continuously but idly driven by the main power; and at another time automatically to disconnect both the spindle and the work-support from the main drive, (thus automatically stopping the milling-cutter at the end of the travel of the table) while making provision whereby a hand lever may then cause the auxiliary motor to return the support to its initial position, and incidentally to arrange this hand lever so that while it is operative during the returning interval to keep the motor in action, still its use will not enable the attendant to start up the cutter by connecting it with either source of power and thus avoid danger.

Preferably, this invention embodies electrically-operated control devices as follows: The compound or multiple switch C is arranged to be impositively operated automatically by the traveling support 74 into neutral position and also adapted to be positively actuated by hand into either of two propelling positions, when desired. This switch in the so-called neutral position opens the magnetic-clutch E and thus disconnects the power from the machine, and at the same time, it short circuits the auxiliary motor through enough resistance to enable it to act as a cushioned dynamic brake to quickly stop the support. In its normal acting position, it connects the motor circuit with the source of electricity, so as to enable the current to flow through the motor, unless its circuit is elsewhere opened by another means B, to rotate it in a given direction (which under certain circumstances may be determined by a second reverser D) and in this position the switch energizes the main magnetic-clutch to drive the spindle of the machine and (under certain circumstances) also the feed mechanism of the traveling support. In a third or hand-reverse position, this multiple switch C effects a current reversal in the circuit of the auxiliary motor, and at the same time leaves the magnetic clutch still deënergized and insures that the automatic capacities of the other devices of the system will be nullified so as not to interfere with the return under hand control. The switch in the preferred embodiment of this invention is thrown into this position only by a hand operation but irrespective of whether it is thrown by hand or by a trip mechanism, its effect will be to cause the table to execute a return stroke while the spindle is stopped. This switch is shown positioned on the machine by Fig. 2, and is shown in structural detail by Figs. 4, 5 and 6. It comprises a cylindrical box $c^1$ having a rear end wall $c^{11}$ adapting it to be bolted to a part of the machine adjacent the reciprocating work support, and having in its lower part an inlet $c$ for the electric wires. The front end-wall $d$ is removable and, like the rear end-wall $b$, is centrally perforated to provide bearings for the shaft $e$ that carries and enables the knife-supporting disks $f$, $g$, and $n$ to be rotated from the intermediate position toward the right or left to close the gaps in certain circuits. These disks are of insulating material, keyed to the shaft $e$, and each carries a pair of diametrically opposed segmental-shaped knives; the knives $z$ and $w$ on the disk $f$ being plain and closing the gap 36—41 in the circuit of the clutch-switch B, as well as the gap 37—38 in the circuit of the magnetic clutch E, when rotated to the left. The knives $v$ and $u$ of the disk $g$, and the knives $o$ and $i$ of the disk $n$, have inwardly radiating portions forming spring-fingers that participate only in short circuiting the motor to form the dynamic brake.

Adjacent each of the rotatable disks $f$, $g$ and $n$ are stationary insulating supports $f^1$, $g^1$ and $n^1$ which serve to position circuit terminal-contacts as follows: The support $f^1$ has bolted to it in the position shown, the terminals 36 and 41 which form the gap indicated by 36—41 on the wiring diagram of Fig. 10 which opens the circuit of the magnetic clutch E. Oppositely located are also terminals 37 and 38 forming the gap 37—38 of the clutch-switch B. When the shaft $e$ is turned to the left, these circuits may be closed, but when it is positioned as shown (neutral) they are open. Similarly, the stationary support $g^1$ carries a terminal 1 that forms the gap 1—3 with the terminal 3; and it also carries the terminal 8 that forms the gap 8—9' with the terminal $9^1$; which are both closed by the knives $v$ and $u$ when they are to the left. (Note: Terminals 9 and $9^1$ are connected permanently together; and so are terminals 1, 1', 1'', etc.) Support $g^1$ also carries the terminal 50 that forms the gap 50—3 with terminal 3, and also it carries terminal 1'' that forms the gap 1''—8 with terminal 8; which gaps are closed when the disk $g$ is in neutral position. Support $g^1$ also carries terminal 3 forming gap 3—7' with terminal 7', and it also carries terminal 8 forming gap 8—9 with terminal 9, which gaps are closed when the disk $g$ has been turned to the right from its neutral position. In like manner, support $n^1$ carries a terminal 6 that forms the gap 6—7 with terminal 7, and it also carries the terminal 2' that forms gap 2'—4 with terminal 4, which gaps are both closed when knives $o$ and $i$ are to the left. So also, support $n^1$ carries a terminal 48, forming gap 48—6 with terminal 6; and it carries terminal 5 forming gap 55—4 with terminal 4; both of which gaps are closed when the disk $n$ is in neutral position. Again, support $n^1$ carries terminal 6 forming gap 6—1' with terminal 1'; and it carries terminal 2 forming gap 2—4 with terminal 4; both of which gaps are closed when disk $n$ is turned to the right from its neutral position. This switch is so designed that it may be automatically released by the table and enabled to spring from either the right or the left into its normal or intermediate position. On the shaft $e$ is a handle 86 whereby it may be set by hand either to the right of the neutral position to obtain a travel of the table to the right, or conversely to the left; in which positions it is held by a trip lever 87 engaging with either recess 88 or 89 on a sector 90 fixed to the shaft $e$, as appears more clearly from Figs. 4 and 5. The trip lever 87 is urged toward the sector by means of a spring 91 and it is automatically actuated as a result of the impact of a dog 92 adjustable along the table with the cone shaped projection 93 on one arm of the said trip-lever 87. To cause the shaft $e$ to turn to its normal or neutral position whenever the trip-lever is actuated, an arm 94 terminates between two plungers 95 and 96 that are each urged by springs 97 and 98 toward the vertical center-line until they are limited in movement by the stop or abutment 99 which is of the same size as the rounded end of the arm 94, and thus the switch will always be resiliently urged toward its neutral position.

The solenoid-operated fast-and-slow clutch switch B is shown arranged at the junction of the support-propelling screw with both the major-power and the auxiliary motor. In the preferred embodiment of this system, the motor at this junction is in permanent mechanical connection with the ultimate support-feeding elements, but the arrangement also enables the power to be additionally mechanically connected or disconnected with the same. This device also controls the circuit of the motor, and is adapted to open such circuit to deënergize the motor, so as to enable it to run idly when the major-power is mechanically connected positively to feed the support. It also may close its portion of the motor's circuit, so that the motor may be energized by throwing the main switch C into direct or reverse driving position at certain operative periods. Under certain circumstances shortly to be explained, this clutch-switch B may also energize an auxiliary reverse device, so that, without moving the main switch C, the electric motor will be electrically reversed, as well as the mechanical driving-connection between the major-power and the traveling support. This clutch-switch B, in the shown embodiment of this invention, is normally operated by electrical means only, and is not intended to be actuated in a purely mechanical way by direct action of abutments on the traveling support, but it is expressly arranged so that, if for any reason the operating solenoids should fail to function, it may then be actuated by the attendant, or mechanically, by means of the handle with which it is furnished as shown. It is further noteworthy that, in the ordinary use of the machine, the clutch switch B may be momentarily moved by hand (against the pull of the solenoids) for the purpose of moving the table to adjust its position. This device is shown in detailed construction by Figs. 2 and 7 and it comprises a rock shaft 100 actuated either by the handle 101 or by the plungers of the solenoids $m$ or $p$, as by means of the double bell-crank 102 and the link 103, or other suitable mechanical connection. This rock-shaft is kept in one or the other of its two extreme positions by means of the spring pressed bevel pin 104 coacting with a suitable cam 105 on such rock-shaft. A forked arm 106 extends from the rock-shaft and slides a clutch member 106' that is splined to the feed screw 107 and, in the position given it by the solenoid $p$, it engages the bevel pinion 108 driven by the primary power through a suitable gear train 109 and thus clutches such major power directly to the feed screw. The clutch collar 106' also has a tongue and slot connection with the pinion 110 that is driven by the auxiliary low power electric motor through the gear train 111. This connection is preferably permanent so that the motor is constantly in mechanical connection with the feed screw 107 and may thus be brought into actual propelling relation with the table by merely energizing it electrically. To do this by the automatic action of this device, a switch is actuated by shaft 100 which not only controls the circuit of the motor, but also the circuits of the solenoids $p$ and $m$ as well as the reverse box D under certain conditions. This switch may be constructed after the lines of the main switch and it may consist of a casing 112 adapted to be bolted to the machine, and having a cover plate 113. Secured to the shaft within the casing is a knife-carrying disk $s$ adapted to be partially rotated to the right and to the left. This disk $s$ carries two knives $b$ and $b^1$. Adjacent the disk is a stationary support $s'$ also of insulating material and carrying the terminals $1^a$ and $1^b$ which form the gap $1^a$—$1^b$; also the terminals 43 and 44 which form the gap 43—44; as well as the terminals 33 and 34 which form the gap 33—34. When the shaft is turned to the left, gap 43—44 is closed by knife $b^1$; but when it is to the right, knife $b$ closes the gap $1^a$—$1^b$, and knife $b^1$ closes gap 33—34.

The clutch mechanism above described obtains slow feeds by clutching in the power and obtains fast drives by energizing the motor, but this invention conceives an organization combining with the electrical operative elements also mechanical stops automatically operated by the table adapted to obtain fast and slow speeds independently of the auxiliary motor by resorting to mechanism such as that disclosed and claimed in my copending application, No. 651,644, filed September 27, 1911.

The support-actuated contact device A is a two-pole switch constructed to be thrown alternately into one or the other of its two positions by successively contacting with dogs adjustably spaced on the traveling support or by being turned backward and forward by a single dog. This device determines the position of the switch clutch B and (when the auxiliary reverse D is divorced from the system) it ultimately determines in one position that the support shall feed slowly by the major power, and in the other position that the support shall travel rapidly by the auxiliary motor. When the auxiliary reverse D is switched into circuit, the one position of the contact device A determines that the support shall travel rapidly from each extremity of its stroke toward an intermediate point, and then slowly from such intermediate point in either direction again to the extremity.

In construction, this device is exceedingly simple and, as will be seen from Fig. 1, it consists of a four-pointed star-wheel 115, that is pivotally mounted on a part of the machine so as to be positioned adjacent the reciprocating support, so that a dog 116, may be caused to impact one of its vanes and give it a quarter-turn. This star-wheel carries an electrical contact arm 117 that always is in electrical connection with the lead from 25 by contacting terminals 26 or 27, and is adapted at each of the odd quarter-turns to contact say with the terminal 28 and at each of the even quarter-turns to contact with the other terminal 40. The dogs used for quarter-turning this device may for intermittent milling all be rigid with the support so as all to impact it in succession and turn it each time during the advance, and reversely turn it during the retreat when it does not function. For continuous milling, the intermediate dog will be rigid, but the dogs 118 at each end of the stroke may be of the click or ratchet type, each swinging freely toward the middle dog, but neither swinging away from it, so that each will give the star-wheel a quarter-turn on the first impact, but upon the immediate reversal and return will swing past such wheel without turning it backward.

The solenoid-operated main-power and motor reverser D is adapted to be actuated by hand in the manner now customary with conventional machines for the purpose of reversing the direction of drive from the main power, and it also is adapted to be electrically connected into the system, whereby it may be operated automatically to reverse the direction of drive from the main power and simultaneously to reverse the direction of the current then passing through the motor circuit so that the motor will run reversely, in correspondence with the then prevailing direction of power drive. A hand operated switch 59 is all that is required to introduce this reverse device D into or withdraw it from the system, and the effect of introducing it into the system is materially to alter the ultimate effect of the device A, in that the latter, instead of producing alternately fast and slow travels, of the support in the same direction, as formerly, will now produce a fast feed for a distance to the right, then a slow feed continued to the right, then a reverse fast feed to the left, then a slow feed continued to the left, then a reverse fast feed to the right, and so on throughout the cycle. The structural details of this reverse device D will be readily understood by referring to Figs. 2 and 3, in which 120 indicates a shaft journaled in the reverse box 121 and receiving its drive from the major or primary power through the flexible shaft 83. Reversing mechanism of a suitable type intervenes between this shaft 120 and the train of gearing 109 that connects with the feed screw, as has already been described. As exemplifying such reversing mechanism, gears 122 and 123 are loosely journaled on a second parallel shaft 124 which carries a gear directly meshing with the train 109. To enable either gear 122 or 123 to be locked to the shaft 104, a suitable clutch collar 125 is splined to the shaft 124 and is adapted to reciprocate to clutch either gear 122 or 123 to such shaft. This clutch member 105 is in turn actuated by an arm extending from the rock shaft 126 and this rock shaft is in turn actuated in three independent ways, i. e. by a hand lever, by an automatic mechanical stop and by an electrical contact system. Thus, a plunger 127 actuated up and down by dogs 128 on the table is racked to a gear shaft 129 to rock the same, and this gear shaft may in like manner be rocked by similar plungers extending from different parts of the machine after the manner disclosed and claimed in my Patent No. 973,766, of October 25, 1910, and others. This gear shaft 129 may be similarly actuated in a non-automatic way by the hand lever 130 the effect of so actuating this shaft is to rock the shaft 126 through the gear segment 131, and the spring pressed double-acting cam device 132 insures that the parts will assume positions only at the extremity of their strokes thereby preventing any erratic action when the parts are automatically moved. The rock shaft 126 is also actuated by solenoids arranged in any suitable manner. For example such shaft may carry a rocking beam lever 133 actuated by plunger armatures extending into solenoids $r$ and $l$ so that when one or the other of these solenoids is energized in the manner herein disclosed, the shaft 126 will throw the clutch sleeve into a direct or reversing position. It may be noted that gear 122 has a direct drive with a gear fast to the shaft 120 whereas gear 123 receives its drive through an intermediate idler 134 so that gear 122 will rotate in one direction and gear 123 in another, thus enabling the direction of drive to be reversed. The gears are so constructed in this organization that in reversing the speeds are unchanged.

The main magnetic clutch E intervenes between the source of the primary power and the driving element for the spindle and the table or support, respectively. When this clutch is operated by suitably throwing the switch C, the main power is divorced from the machine so that the spindle ceases to turn and the table or support reciprocates only by reason of its connection with the auxiliary motor, so that conditions of complete safety prevail in the machine. The structural details of this device clearly appear in Fig. 9 in which 135 indicates a driving shaft which will be geared to the spindle, etc. The pulley 80 is journaled on a part 136 that may be stationary and it has an annular flange 137 which is adapted to be magnetically clutched to the driving shaft as follows: A magnet-frame 138 is splined to the shaft, and has an annular recess in which is seated the magnetizing coil 139 and two annular split clamp rings 140 and 141 are adjustably screw-threaded to the periphery of the magnet frame 138, so that the one ring 140 may bear against the side of the flange 137. The clamp plate 142 is mounted on the other side of the annular flange 137 and is retained against rotating by the bolts 143 and is normally maintained by spring pressure away from the magnet and into frictional abutment with the stationary part 144, so as also to press the other annular ring 141 against and into frictional contact with the fixed portion 145 of the frame of the machine, and thus bring the shaft 135 to a stop. These pressures result from the springs 146 that are seated in sockets in the magnet 138. When, however, the coil is energized by means of current received from the two brushes 147 and 148, the plate 142 is drawn up so as to clamp the flange 137 between it and the other ring 140. These rings, being adjustable, facilitate taking up any wear in this device.

Operation: Suppose it is desired to mill several pieces of work bolted in successive order to the table. This may be done by advancing the table rapidly until the first piece is brought to the tool; then slowly until it has been surfaced; then again skipping rapidly to the next piece; then slowly feeding until that piece has also been finished; and so on until the last piece has been finished when the table must be stopped all by automatic action to enable the various pieces to be replaced and then the table should permit of being rapidly returned to its starting point by merely throwing a hand lever. In setting up the machine for this particular action, rigid dogs will be placed at intervals on the table, corresponding to the distances between the several pieces, and extra stopping dogs will be arranged at points at the extremities of the throw of the table to throw the main switch C when all of the pieces have been finished, and it is desired to stop the table at the end of its forward as well as return movement. Assume switch A to be connecting terminals 26 and 40 and clutch-switch B to be connecting contacts $1^a$ and $1^b$; and main switch C in neutral position, and switch 59 open. The magnetic clutch is now deënergized, and the main power thus disconnected and the motor is also deënergized. Now, to start the table rapidly to bring the tool into contact with the first piece, the main switch C is initially thrown to the left or anti-clockwise by hand. This at once closes the circuit from the mains through the magnetic clutch, and establishes driving connection between the primary power and the machine, thus starting the spindle and the driving system extending therefrom to the clutch switch B, which, now, however, is in a position such that the auxiliary motor alone is in a mechanical driving connection with the table or support. The motor circuit is now established as follows: 57—$1^a$—$1^b$—$2'$—$i$—4—55—6—$o$—7—58—10—$r'$—11—13—motor—14—16—$l'$—17—1—$v$—3—20—8—$u$—$9'$—24—39. The motor thus goes lefthanded (13—14) and drives the table rapidly forward to the left until the first dog gives a quarter turn to the switch A, setting it in vertical position, whereupon contact is made with the terminal 28, and a current flows as follows: 25—26—$26'$—$a$—28—33—$b'$—34—29—$p$—30—31—32—37—$w$—38 and 39 thereby energizing solenoid $p$ and at once throwing clutch switch B to the left or anti-clockwise so as to open the motor circuit between $1^a$ and $1^b$, thus deënergizing the motor (but not mechanically disconnecting it) and at the same time mechanically connecting the primary power with the table or support to establish a slow-feeding propulsion thereof. This slow feeding continues until the first piece of work has been tooled, whereupon another dog impacts the switch A and again gives it a quarter turn once more bringing it horizontally and establishing electrical contact with the terminal 40. A current now flows from 25—26—$a$—40—43—$b'$—44—60—45—through solenoid —$m$ to 46—31—32—37—$w$—38 and 39 to the lead again. This energizes solenoid *m* and again throws switch B back clockwise to its original position declutching the power feed and closing the motor circuit through 1ᵃ and 1ᵇ, thus energizing the motor and causing it to move the table rapidly. This cycle will be repeated as often as there are separate pieces of work on the table until finally the last piece will have been milled and the table will have started rapidly or slowly as the case may be depending upon whether or not a dog is positioned at the point where the tool left the work for the last time, and the table will travel until the stop dog contacts the release pawl of the main switch C and allows it to spring it into a neutral position, whereupon the motor circuit will be opened between 37 and 38, and the magnetic clutch will be deënergized by opening gap 36—41 in the circuit, thus bringing the entire machine to a standstill. The attendant will now remove the work whereupon the table or work support is now ready to be brought to its initial starting position to bolt on unfinished pieces, and this is done (without energizing the magnetic clutch to start the spindle) by the hand operation of throwing the main switch C to the right thereby establishing a circuit in a reverse direction through the armature of the motor as follows: 57—1ᵃ—1ᵇ—2—*i*—4—55—6—*o*— *l'*—17—*l'*—16—14—13—11—*r'*—10—58— 7—*v*—3—20—8—*u*—9'—24— thus turning the motor reversely (14, 13) and causing the table to travel rapidly to its starting position whereupon a second stop dog will throw the switch C into neutral position to short circuit the motor on its own circuit through enough resistance 49 as will cause the table to come to a somewhat cushioned stop, the circuit now being as follows: 48—49—50— *v*—3—20—8—*u*—1''—54—17—*l'*—16—14— 13—11—*r'*—10—58—5—*i*—4—55—6—*o*— 48. By permanently maintaining the mechanical connection between the motor and the support, instead of unclutching it during the slow power feed, the structure is simplified and made more reliable, and when the motor is to be converted into a driver for the support, its momentum is already established and there is no shock or halt in its picking up speed, nor does the current have to "build up" the motor to the extent that would be necessary were it initially stationary. It need not, however, be so connected and if desired a clutch may be intervened between it and the support.

Alternative operation: In the above described operation, the attendant did not bolt new work to the table or support while the tooling of the other pieces was in progress but waited until the machine had been brought to a standstill. In machining certain classes of work, especially with larger pieces, the tooling period is longer than the time required for removing and replacing the work. For such cases, this invention proposes an automatic regulation that enables the attendant to keep the machine in practically continuous milling, and this is done merely by closing the hand switch 59 without in any manner altering or disturbing any of the other settings of the machine, except in using a fixed intermediate dog for retarding the speed at a station usually midway the stroke of the support, and using two additional pivoted ratchet dogs in positions corresponding with the outermost edges of the pieces to be alternately milled, to effect a reversal and speed increase at such points. The effect of doing this will now be described in detail. Assume the table to be at the right hand extremity of its stroke and that it has two pieces of work bolted to it, the one at the left being finished and the other at the right being unfinished. The cutter will then be located at the extreme left hand end of the finished piece of work and, efficiently to bring it into contact with the unfinished piece of work, it is necessary to move the table rapidly about half-way its stroke to the left, causing the cutter rapidly to travel over the already finished work and advancing it forward of the cutter when it is most accessible to the attendant who then proceeds to remove it. During this fast traveling interval to the left, the main switch C was thrown to the left completing the circuit of the motor with the mains, etc., as has already been described, and the clutch switch B is now to the right closing the motor circuit through gap 1ᵃ—1ᵇ and declutching the primary power. The contact switch A is now horizontal and connects terminal 40. After quickly completing the half stroke to the left, the intermediate rigid table dog trips A to vertical position closing the gap 26—28, and energizing solenoid *p* which in turn throws the clutch switch B to the left, thus opening the motor circuit and mechanically clutching in the primary power which now feeds the table slowly throughout its last half stroke to the left until a pivoted dog again trips A through a quarter turn so as to complete the circuit from the mains to the terminal 40. Since the hand switch 59 stands permanently closed and since the gap 43—44, is closed in the present position of the clutch switch B, one of the reverse box solenoids is energized (in this instance the coil *r* through the circuit 25—26—*a*—40—43—*b'*—44—60—61—62— *l''*—63—64—*r*—65—66—32—37—*w*—38— 39) and simultaneously the clutch switch solenoid *m* is energized. In actual practice, the reverse box solenoids will be so constructed that the one energized immediately following the closing of the gap 26—40 will be enabled to set in motion the reverse mechanism for the primary power (which also reverses the circuit through the motor's armature) before the solenoid m has completely thrown the switch clutch B so that the movements of the parts will be so timed and their momentums will so act that there will be no chatter or reflex action. When the coil r (changing to right drive) has been energized as stated, it reverses the motor circuit by closing the gaps 12—67 and 9—15 while opening the gaps 11—10 and 16—17 so that the circuit of the motor is 57—1—1ᵃ —b—1ᵇ—2'—i—4—55—6—o—7—58—10— 19—7'—15—14—13—12—r'—67—17—1—v —3—20—8—u—9—24—39. The motor now being reversed (14—13) the table will run rapidly to the right for the first half stroke, whereupon the end pivoted dog will ineffectively swing back over the star-wheel and the middle rigid dog will again trip it backward a quarter turn, thus once more bringing A to a vertical position closing the gap 26—28 and energizing solenoid p which thus throws the clutch switch B anti-clockwise to connect in the power-feed and open the motor-circuit. This is accomplished without energizing either of the reverse box solenoids and hence the drive will not be reversed though it will be reduced in speed so that the cutter will now be milling the work during the last half stroke to the right of the table. As soon as the end of the last stroke (slow) of the table to the right is completed, it now becomes necessary forthwith to reverse again and simultaneously speed up to complete the first half stroke to the left. This is done by a dog that trips the switch A to a horizontal position closing the gap 26—40 and simultaneously energizing reverse box solenoid (changing to left drive) the clutch-switch solenoid m so that the direction of the motor and of the application of the primary power are first both reversed and forthwith the clutch switch B is thrown to disconnect the primary power and speed up the motor.

The operation may be more easily followed by assuming that the milling-table on which the work is to be bolted consists primarily of two sections or portions, i. e., the right-hand half-section and the left-hand half-section. Now, let the workman bolt a casting to-be-machined onto the right-hand half-section; leaving the left-hand half-section blank and with its left-hand end positioned underneath the milling-cutter. He now starts the machine, and the table forthwith makes a quick-traverse to the left through a distance of about half its length until the blank section has been moved to the left quite clear of the cutter. The cutter is now about to be brought into tooling relation with the work bolted on the right-hand section of the table. This having been done, the rate of table travel is then abruptly reduced to a so-called "feed" although its advance toward the left is maintained, so that, when the cutter comes into contact with the work, the rate of travel will be commensurate with the work to be done. This travel of the table toward the left will continue until the tool has passed entirely through the work; all of which consumes quite a little time. Now, during this last half-stroke, the blank left-hand table-section has been slowly advancing to the left (while entirely clear of the cutter) and its position has been such that it has been quite accessible to the workman for the purpose of bolting a second piece of work onto the left-hand section, and the time interval will also be sufficient since the workman can detach a finished casting and attach a new piece of work during the ordinary tooling operation. There is, therefore, no loss of time because, very shortly after the workman has bolted on the second casting, the tooling operation on the casting at the right-hand table-section will have been completed, and the next step of the cycle may then take place. This step is an automatic reversal of the direction of the travel of the table concomitantly with a change of its rate of travel, so that the table now makes a quick-traverse to the right for say about a half-stroke, thereby bringing the cutter back over the just-finished surface of the right-hand casting; thereby bringing it into the position from which it may begin its slow advance to tool the second casting bolted on the left-hand table section. At this point the rate of travel of the table is abruptly reduced to a "feed", although the direction of movement is still maintained toward the left. The milling cutter begins tooling the second casting and this operation involves a considerable time-interval, as previously described, and, during this second time-interval, the first piece of work is clear of the cutter and the table is advancing toward the right so slowly that the workman is enabled to remove the finished piece and replace it by a third casting before the table starts quickly to the left to bring the tool into working position with this third casting. This cycle of operations is thus automatically carried out independently of any hand operations by the attendant so that the machine is practically continuously milling; skipping rapidly from one piece to the other to save time; and during the slower milling periods enabling the attendant to remove finished and bolt on unfinished pieces.

It will thus be perceived that this invention is well adapted to achieve the objects and ends indicated in the foregoing by a control system, that is very simple considering its manifold capacities and adaptabilities. It is especially noteworthy that this system perfectly harmonizes with the purely mechanical controls in the sense that the shift elements are moved by solenoids which do not when deënergized offer any resistance to or interfere with their actuation by hand or mechanical means. This is especially advantageous since should the electrical system become deranged through any cause the mechanical control is still available for many purposes and the hand control for all purposes is still available.

Without further elaboration, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

Having thus described this invention, I claim as new and desire to secure by Letters Patent of the United States:—

1. A control system of the nature disclosed, combining a traveling support, a power-driven prime mover, a mechanical connection extending from said prime mover to said support for feeding the same forwardly at a reduced rate, a dynamo actuated by said prime mover, an auxiliary electric motor deriving energy from said prime mover and adapted rapidly to forwardly propel said support, and clutch mechanism adapted alternatively to establish an operative propelling relation between said connection or said motor and said support.

2. A control-system of the nature disclosed combining a traveling support, a mechanical power-driven means for feeding the same forwardly at a reduced rate, an auxiliary electric motor adapted rapidly to forwardly propel said support, clutch mechanism adapted alternatively to establish an operative propelling relation between said means or said motor and said support, and a contact instrumentality actuated by said traveling support for operating said clutch mechanism.

3. A control-system of the nature disclosed combining a traveling support, a power-driven means, an auxiliary motor, a clutch for establishing a forward driving relation between said support and either said means or said motor, an electro-magnetic instrumentality for controlling the action of said clutch, and a contact-system actuated by said support for determining the action of said instrumentality.

4. A control-system of the nature disclosed combining a traveling support, power-driven means adapted to feed the same forwardly slowly, an auxiliary motor adapted rapidly to forwardly propel said support, means alternately establishing an operative propelling relation between said means or said motor and said support, an instrumentality controlling said latter means, and a support-actuated means for determining the action of said instrumentality.

5. A control-system of the nature disclosed combining a traveling support, means for reciprocating said support back and forth between extreme positions, and automatic control mechanism for said means for causing said support to be moved rapidly throughout the first-half of each complete backward as well as forward stroke, and slowly throughout the remaining half.

6. A control-system of the nature disclosed combining a traveling support, power-driven means adapted to feed the same slowly, an auxiliary means adapted rapidly to propel said support, and means automatically establishing a propelling relation between said auxiliary means and said support during the first half of the forward stroke thereof as well as during the first half of the backward stroke thereof, and for similarly connecting the power-driven means with said support during the remaining portions of both the forward and backward strokes of said support.

7. A control-system of the nature disclosed combining a traveling support, means for reciprocating said support back and forth between extreme positions, and automatic control mechanism for said means for causing said support to be moved rapidly throughout the first portion of each complete backward as well as forward stroke, and slowly throughout the remaining portion.

8. A control-system of the nature disclosed combining a traveling support, a power-driven member, an electric motor, a clutch mechanism for connecting said member with said support or disconnecting the same, and a circuit-controller operated by said clutch mechanism for energizing said motor when it is connected with said support, and for short-circuiting the motor through suitable resistance to form a dynamic brake at a time when said member has been disconnected from said support.

9. A control-system of the nature disclosed combining a traveling support, a power-driven member, an electric motor, a clutch mechanism for connecting said member with said support, a circuit-controller operated by said clutch mechanism for energizing said motor only when said member is disconnected from said support, and a second circuit-controller operated by said support for short-circuiting the motor through suitable resistance to form a dynamic brake for said support.

10. A control-system of the nature disclosed combining a traveling support, a power-driven member, an electric motor, a clutch mechanism for connecting said member with said support, a circuit-controller operated by said clutch mechanism for energizing said motor only when said member is disconnected from said support, and a second circuit-controller operated by said support for short-circuiting the motor to form a dynamic brake, said first circuit-controller being adapted to open the motor's circuit independently of said second circuit controller.

11. A control-system of the nature disclosed combining a traveling support, an electric motor for propelling said support, a power-driven element, a clutch mechanism for disengaging said element, a switch actuated by said support for reversing said motor, and an instrumentality operated by said clutch mechanism for reversing said motor independently of control by said switch.

12. A control-system of the nature disclosed combining a traveling support, power driven means for propelling the same, an electric motor for propelling the same independently of said means, a mechanical reversing connection between said means and said support, a reversing switch for said motor, and means for simultaneously operating said switch and said reversing connection.

13. A control-system of the nature disclosed combining a traveling support, power driven means for propelling the same, an electric motor for propelling the same independently of said means, a mechanical reversing connection between said means and said support, a reversing switch for said motor, and electro-magnetic means energized through contacts established by said support for simultaneously operating said switch and said mechanical reversing connection.

14. A control-system of the nature disclosed combining a traveling support, power driven means for propelling the same, a clutch for disconnecting the driving connection between said means and said support, an electric motor for propelling the support independently of said means, a mechanical reversing device in the driving connection between said means and said support, a reversing switch for said motor, and means for alternately operating said clutch and then simultaneously operating said switch and reverse device.

15. A control-system of the nature disclosed combining a traveling support, power driven means for propelling the same, a magnetically operated clutch for disconnecting the driving connection between said means and support, an electric motor for propelling the support independently of said means, a combined electrical motor reverser and mechanical reverser for the power driven means, and electric magnetic means energized through contacts established by said support for alternately operating said clutch and combined reverser.

16. A control-system of the nature disclosed combining a traveling support an electric motor having a driving connection therewith, a switch for opening the circuit of said electric motor, a pair of solenoids each adapted to move said switch in an opposite direction, a contact device operated by dogs on said support for alternately energizing the one and the other of said solenoids to energize and deënergize said motor and switch mechanism independently actuated by said support for independently opening the circuit of said motor.

17. A control-system of the nature disclosed combining a traveling support, power driven means for propelling the same, a magnetically operated clutch for disconnecting said means from said support, a pair of solenoids each adapted to move said clutch in an opposite direction, a series of dogs spaced along said support, and a contact device adapted to be actuated by each of said dogs in progressive succession to energize alternately the one and the other of the solenoids alternately to connect and disconnect said means with said support while said support is moving continuously in the same direction.

18. A control-system of the nature disclosed combining a traveling support, means for propelling said support, a magnetically operated clutch for connecting and disconnecting said means with said support, a rotatable star-wheel having an even number of spokes mounted adjacent said support, a plurality of dogs spaced along said support each adapted in succession to engage a spoke and angularly rotate said wheel through the angle determined by a pair of spokes, a switch arm rotatable with said star-wheel and having half as many spokes as the same, a pair of contacts arranged to contact one or the other of said switch spokes at any position of the latter determined by said actuation of said star-wheel, and an electrical circuit for differentially energizing said clutch through one or the other of said contacts.

19. A control-system of the nature disclosed combining a traveling support, mechanism for propelling the same, electro-magnetic means for reversing the direction of said mechanism, an electro-magnetic clutch for connecting and disconnecting said mechanism from said support, a circuit for operating said means and for operating said clutch to disconnect said mechanism, and a second circuit for operating said clutch alone to connect said mechanism with said support, and a support actuated switch for closing said second circuit through a source of electricity independently of said first circuit.

20. A control-system of the nature disclosed combining a traveling support, propelling mechanism therefor adapted to operate in either direction, a magnetically operated direction reverser for said mechanism, a magnetically operated clutch for connecting or disconnecting said mechanism from said support, a two-branch circuit for alternately operating said clutch to connect or disconnect said mechanism, and a second circuit adapted to be connected with one branch of said first circuit to enable said direction reverser to operate whenever said mechanism is disconnected from said support by said magnetic clutch.

21. A control-system of the nature disclosed combining a traveling support, an electric motor for propelling the same, an electromagnetic pole changer for reversing the direction of operation of said motor, an electro-magnetic circuit closer adapted to energize and deënergize said pole-changer, a series of dogs on said support, and a contact device adapted to be actuated in alternate directions by the advance and return of an intermediate dog of said series to electrically operate said circuit closer whereby the motor will each time be energized to accelerate its speed alternately in one direction and then in another.

22. A control-system of the nature disclosed combining a traveling support, an electric motor for propelling the same, an electro-magnetic pole changer for reversing the direction of operation of said motor, an electro-magnetic circuit closer adapted to energize or deënergize said pole changer, a pair of dogs spaced apart on said support, a contact device adapted to be moved into the same position by each of said dogs to reverse the circuit of said motor through said circuit closer and pole changer, and a dog on said support intermediate said two dogs to turn said contact device into another position during the intermediate movement of said support.

23. A control-system of the nature disclosed combining a traveling support, an electric motor for propelling the same, a combined magnetic pole changer and cutout adapted when energized in a predetermined manner to reverse the direction of rotation of said motor and when energized in another manner to open the circuit of said motor, three dogs spaced along said support, and a contact device adapted to be moved by the end dogs to energize said combined pole changer and cut-out in said predetermined manner, the intermediate dog being adapted to move said device to energize it in said other manner.

24. A control-system of the nature disclosed combining a traveling support, an electric motor for propelling the same, a combined magnetic pole changer and cutout adapted when energized in a predetermined manner to reverse the direction of rotation of said motor and when energized in another manner to open the circuit of said motor, three dogs spaced along said support, a contact device adapted to be moved by the end dogs to energize said combined pole changer and cut-out in said predetermined manner, the intermediate dog being adapted to move said device to energize it in said other manner, and a hand operated switch adapted to render it ineffective to reverse the direction of rotation of said motor without rendering it ineffective to open the circuit thereof.

In testimony whereof, I have hereunto set my hand.

ADOLPH L. DE LEEUW.

Witnesses:
 CLARENCE B. FOSTER,
 OLIVER B. KAISER.